Feb. 4, 1969  H. KNOHL  3,425,246
PROTUBERANCE COVERING TUBULAR ELASTIC GARMENTS
Filed Sept. 22, 1966  Sheet 1 of 6
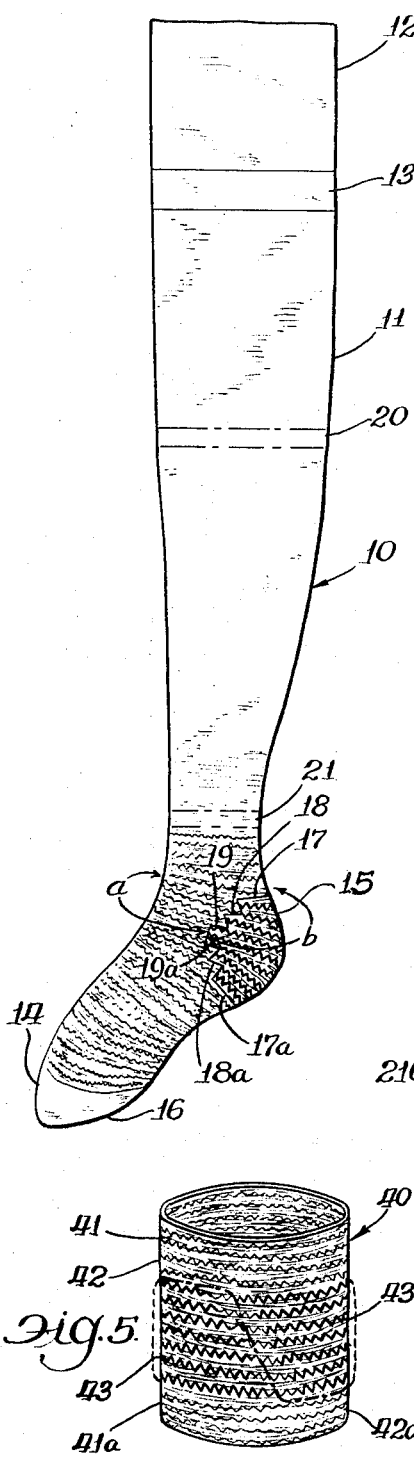
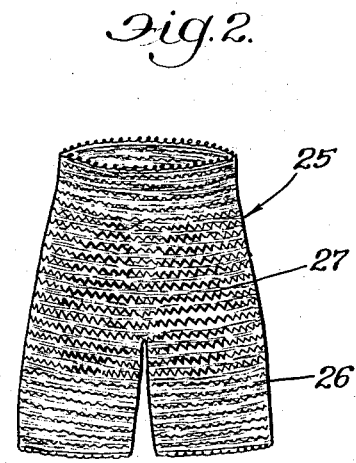
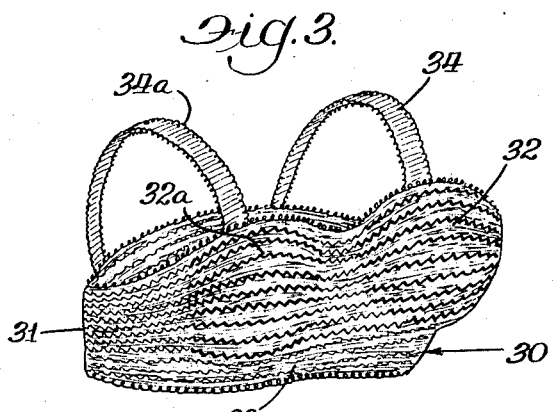
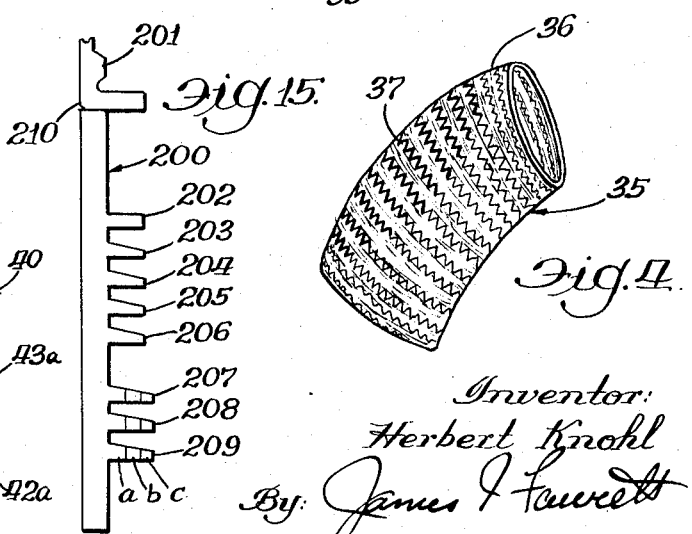
Inventor:
Herbert Knohl
By James I. Fawcett
Atty

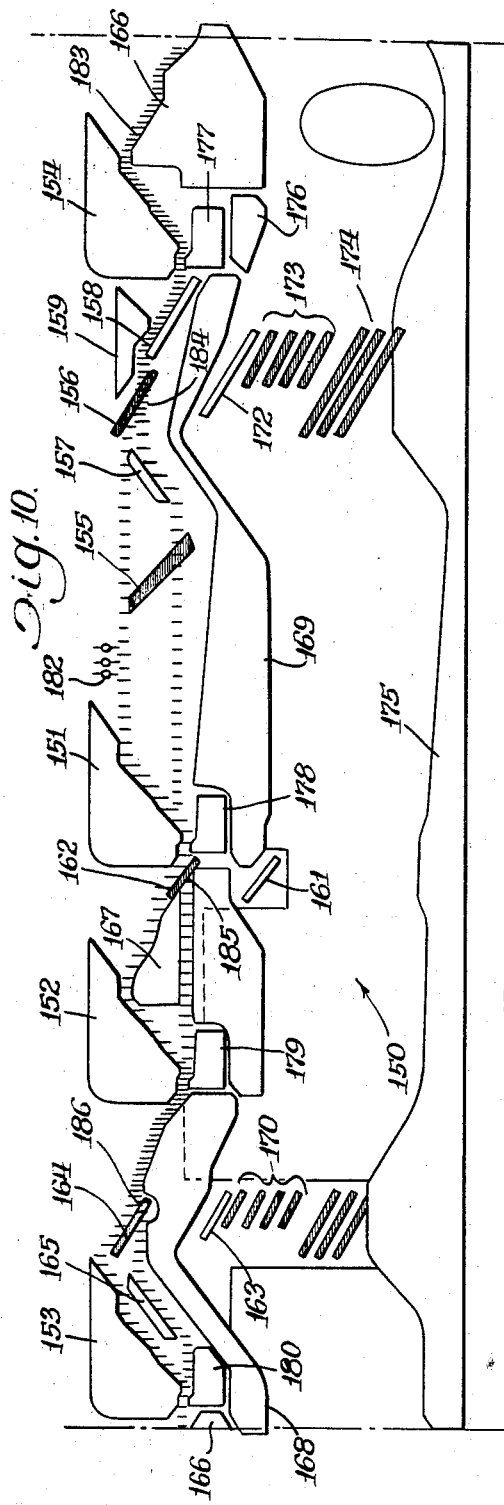
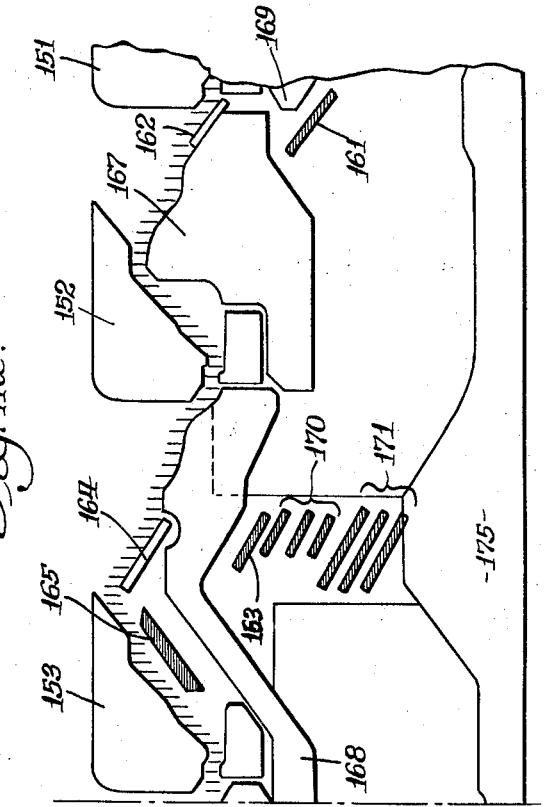
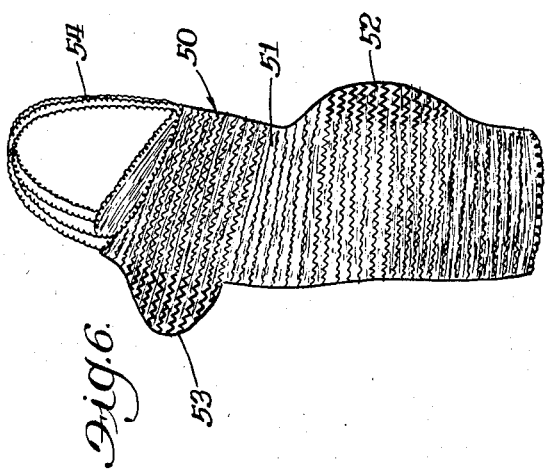

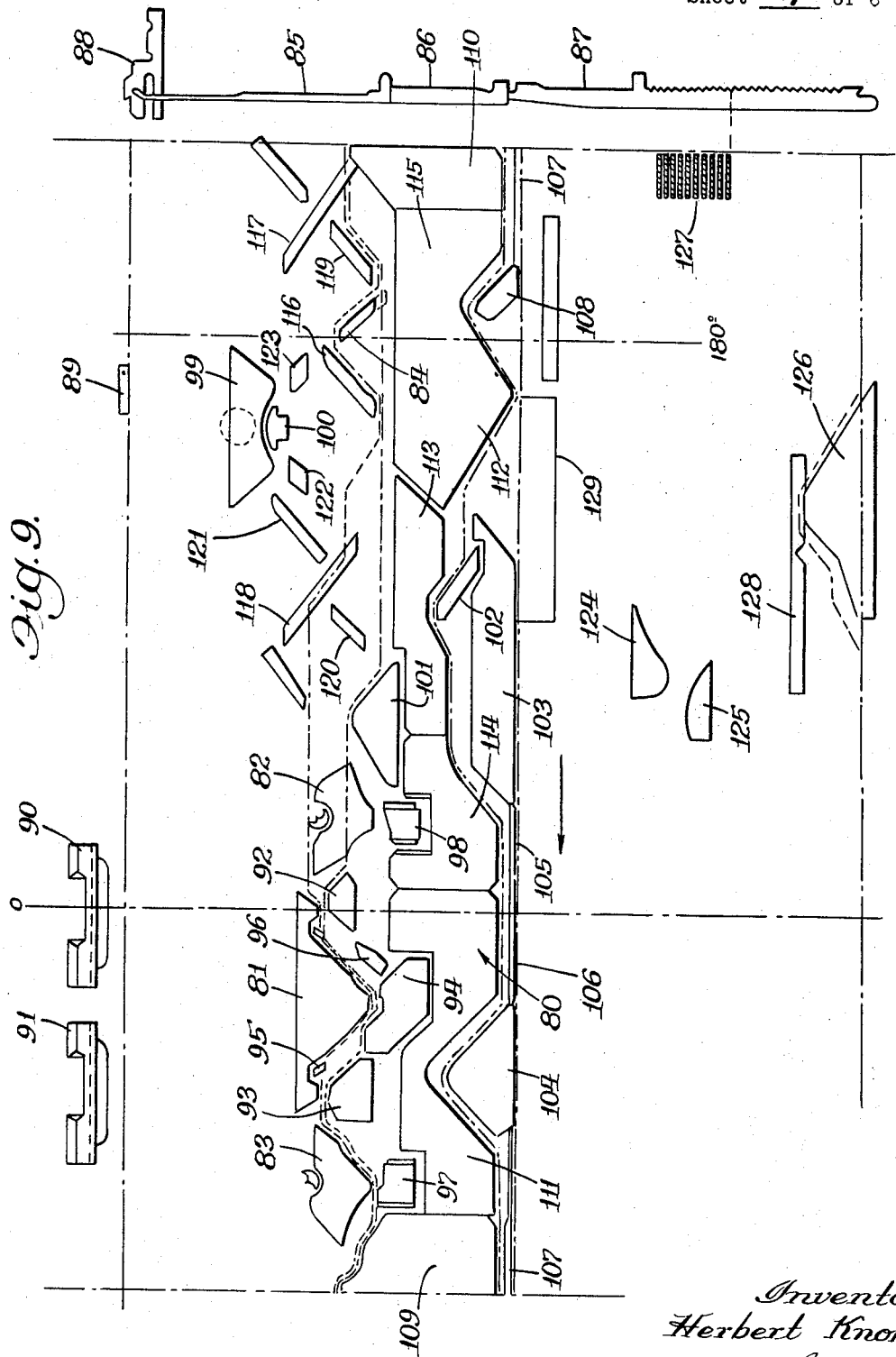

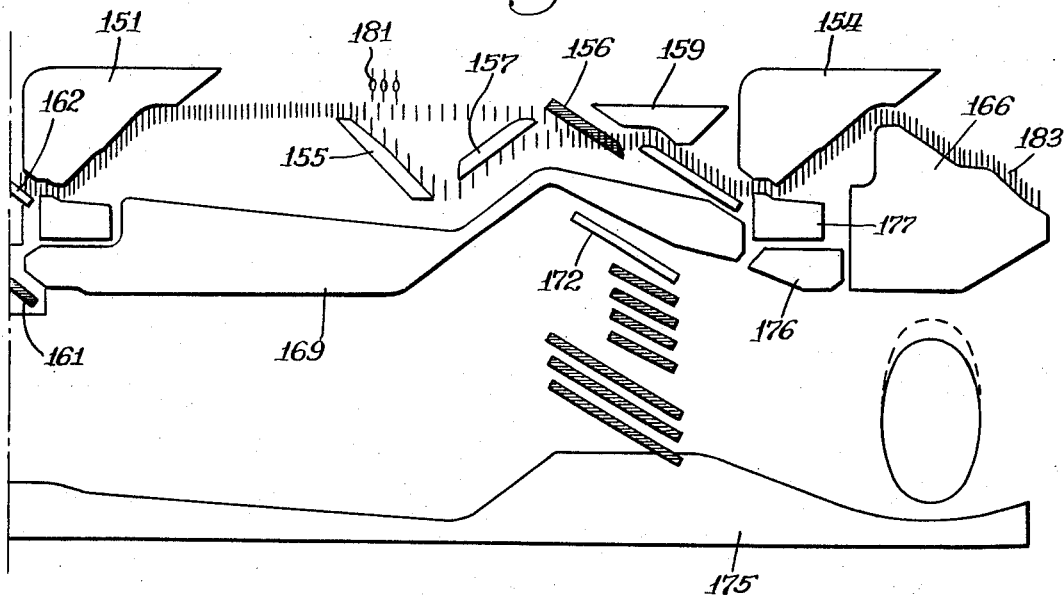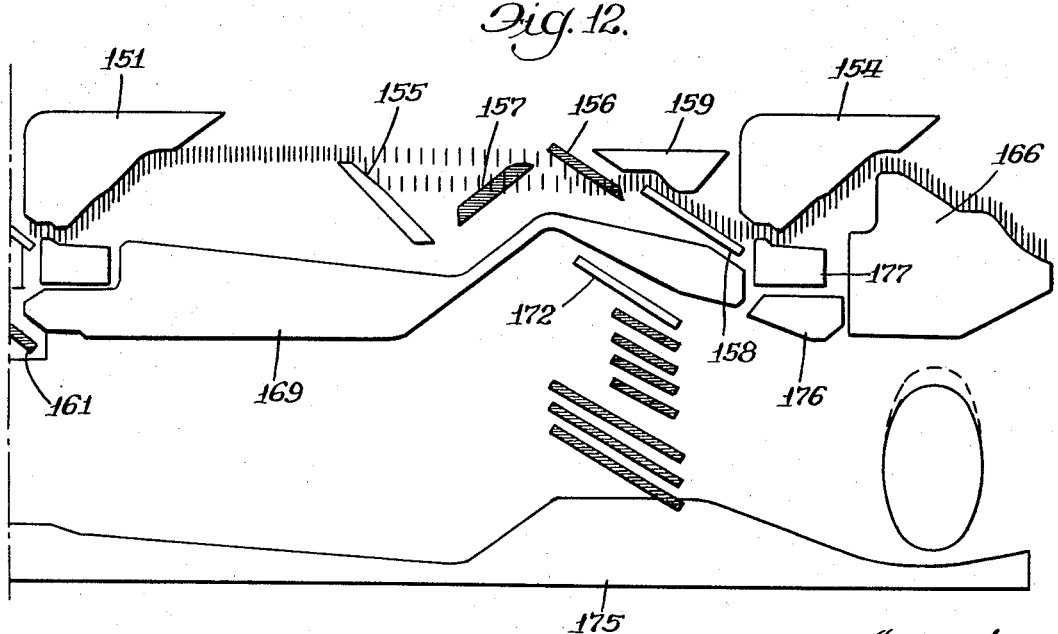

United States Patent Office 3,425,246
Patented Feb. 4, 1969

3,425,246
PROTURBERANCE COVERING TUBULAR
ELASTIC GARMENTS
Herbert Knohl, Seneca, S.C., assignor to The
Kendall Company, Walpole, Mass., a corporation of Massachusetts
Filed Sept. 22, 1966, Ser. No. 581,319
U.S. Cl. 66—171         14 Claims
Int. Cl. D04b 21/18; A41b 7/00

ABSTRACT OF THE DISCLOSURE

Tubular, jersey-knit garments incorporating elastomeric yarns in selected areas wherein the elastomeric yarn is locked in every course in which it occurs, major portions extending coursewise as, for instance, in inlay yarn and one or more selected areas each extending only partially around the tubular circuference as a convexity stretchable in all directions.

---

This invention is concerned with tubular elastic garments containing elastomeric yarns in which the elastomeric yarn is incorporated differently in areas covering body protuberances than in areas covering less protuberant body surfaces.

The invention has particular application in the elastic and support stocking field but it has other applications in elastic garments covering protuberances from the body portion and body joints where it is desirable to have a snug elastic fit against the surface areas of the convexity. Thus the garments of this invention include such tubular knitted garments as brassieres, girdles, knee guards and coverings, ankle and elbow guards and coverings, men's support garments, bathing suits and bifurcated garments such as leotards, shorts, panty-hose, bathing trunks, and stretch slacks.

Basically the invention is concerned with garments knitted on tubular multifeed single needle-bed machines in which one or more nonelastomeric thermoplastic textile yarns such as nylon, polypropylene or the like, forms a substantial portion of the knitted fabric and in which elastomeric yarn is incorporated in one area having major portions extending coursewise of and locked in the knitted fabric in every course in which it occurs, the elastomeric yarn being knitted as stitches in separate partial courses in one or more other selected panel areas of the tubular structure. The knitted elastomeric stitches may occur either in every wale or with alternating patterns so that every wale in the selected area includes at least one elastomeric yarn stitch in that area. Where it is desirable to have more stretch or where the protuberance is more pronounced it is preferred to have a plurality of elastomeric yarn stitches. Thus the wales at the edges of the protuberance may have fewer elastomeric yarn stitches than the wales which pass directly over the protuberance. The properties of the elastomeric yarn obviously may be selected to produce a garment with overall snug clinging action or with more pronounced shaping and compressing action as desired.

"Elastomeric stretch" as used in this invention refers to the elongation of polymeric material which is inherently elastic regardless of its shape or configuration.

It is an object of the invention to provide tubular knit garments of the type produced on single-bed circular machines with two way elastomeric stretch in certain selected areas and with substantially different elastomeric stretch in other areas, the elastomeric yarns being continuous from one area to the other.

It is a further object of the invention to provide tubular knit garments of the type produced on single-bed circular machines with protuberance or joint shaping by adding partial courses of knitted elastomeric yarn extending less than the circumference, yarn of the knitted elastomeric partial courses being continuous with elastomeric yarn in areas outside the protuberance area and having major portions extending coursewise spiroidally and locked into the knitted fabric.

Other objects of the invention will be apparent from an examination of the specification and drawings.

Referring now to the drawings:

FIGURE 1 illustrates a typical garment of the invention, an elastic stocking in which the heel represents the area of protuberance shaping.

FIGURE 2 illustrates a typical garment of the invention, an elastic girdle in which the areas covering the fleshy portions of the derriere represent the areas of protuberance shaping.

FIGURE 3 illustrates a typical garment of the invention, an elastic brassiere in one piece except for shoulder straps in which the areas covering the breasts represent the areas of protuberance shaping.

FIGURE 4 illustrates a typical garment of the invention, an elastic bandage or guard for the elbow or knee in which the area covering the joint represents the area of protuberance.

FIGURE 5 illustrates a tubular blank form from which two men's supporters may be made by cutting around the protuberance areas and sealing, overcasting or otherwise securing the cut edges to prevent runs.

FIGURE 6 illustrates a bathing suit typical of the invention wherein the areas covering the breasts and fleshy portions of the derriere represents the areas of protuberance.

FIGURE 9 illustrates a typical cam ring layout for making elastic foot covering garments of the invention, a modification of the AMF machine originally sold by Scott and Williams of Laconia, N.H., whose facilities have now been acquired by White Consolidated Industries.

FIGURE 10 illustrates another typical cam ring layout for making elastic foot garments of the invention, a modification of the LBMF machine illustrated in U.S. Patent No. 3,148,518 sold by The Singer Company, Fidelity Division, High Point, N.C., and showing the needle movement in the initial makeup.

FIGURE 11 illustrates the needle movement of the modified LBMF machine in subsequent makeup. This is the same needle movement for the transfer after the welt is completed.

FIGURE 11a illustrates the needle movement of the modified LBMF machne complementing that shown in FIGURES 11, 12, 13, and 14 after the needles pass under the number 1 stitch cam.

FIGURE 12 illustrates the needle movement of the modified LBMF machine in making the welt.

FIGURE 15 illustrates a typical jack of the LBMF machine.

Figure 7:
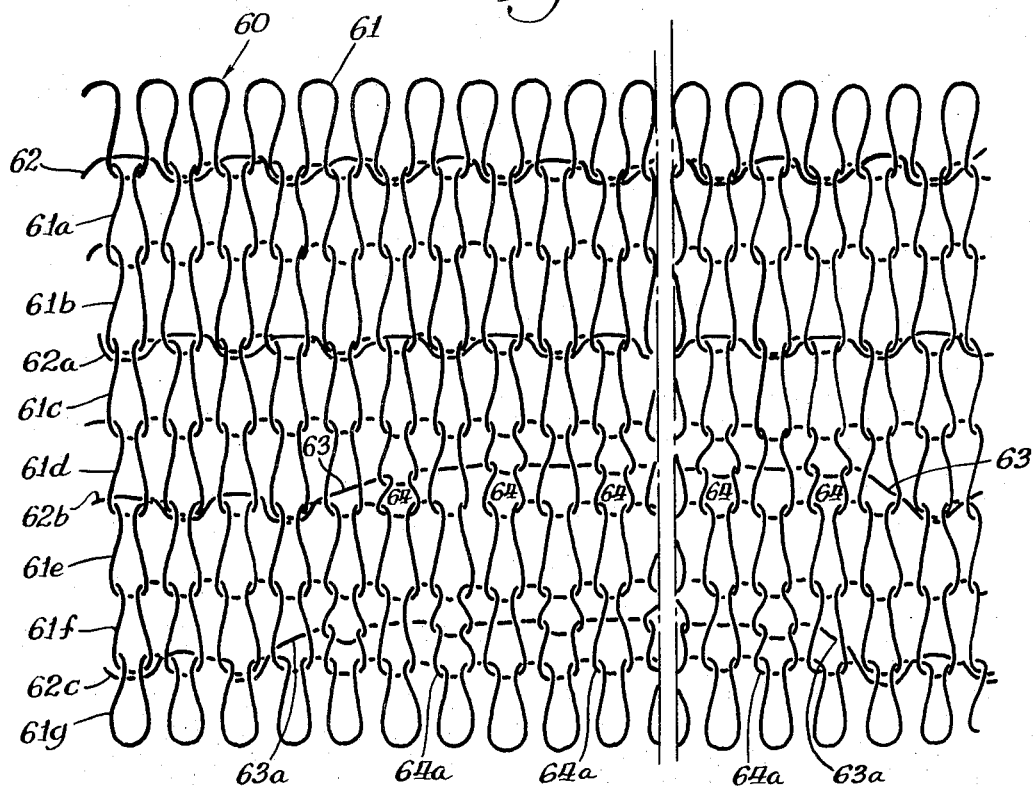
FIGURE 7 illustrates a typical fabric of a garment of the invention in which the elastomeric yarn is inlaid in every second course execpt in the area of the protuberance where it is knitted to form an interposed partial knitted course with stitches in alternate wales, adjacent rounds of elastomeric yarn being knitted with stitches in intermediate wales.

The advantages of this invention are substantially realized by using at least a two feed single needle-bed circular knitting system either with or without reciprocation features. It is preferred to utilize at least a three feed machine, however, and of course greater economical advantages may be realized by using a four or more feed machine. In any case, all of the feeds may be utilized for knitting the nonelastomeric portions of the garment. But when the elastomeric-stretch body is to be knitted at least one and possibly two of the feeds may be utilized for inlaying or otherwise incorporating the elastomeric yarn so that substantial portions thereof extend coursewise and so that it is locked in at frequent intervals in every course in which it appears. The preferred garments have an elastomeric yarn inlaid in selected courses in the elastomeric stretch body portion outside the area of the protuberance with the same elastomeric yarn knitted into form additional partial courses in the areas intended to cover the protuberances. During preboarding the nylon or other thermoplastic structural yarn (which may be torque yarn or other stretch type yarn) is shaped in the areas intended to cover the protuberances. It is preferred that thermoplastic elastomeric yarns be utilized in the garments of this invention because while such yarns may retract slightly from the preboard shape they do set to form garments with attractive counter appearance and elastomeric stretch when stretched beyond the preboard dimensions. But elastomeric yarns which do not take a thermoplastic set such as rubber yarns are satisfactory and produce functional garments with less attractive counter appearance.

Both thermoplastic elastomeric yarns and non-thermoplastic elastomeric yarns may be metered in by utilizing proper yarn furnishers such as that illustrated in U.S. Patent No. 3,209,558, issued to James T. Cargill. This procedure permits the amount of elastomeric yarn per round to be regulated so that the yarn is preferably only slightly stretched when placed on the preboarding form.

In any event, when the elastomeric stretch body of the garment is to be knit, one or more of the feeds is utilized for incorporating the elastic yarn in the manner set forth in my reissue patent, Re. 25,046. That is, only selected spaced needles (preferably alternate) rise to take elastomeric yarn at tuck level and then descend. The previous stitch loop is also in the hooks of these needles which did not clear because the rise was only to tuck level. As the selected needles descend, the sinkers move inwardly catching the elastomeric yarn in the nibs and pushing it inwardly over and beyond the hooks of the nonselected (intermediate) needles which did not rise when the selected needles were raised to tuck level. As all of the needles rise to take new nonelastic yarn, the elastomeric yarn is held down by the sinkers and slides down relatively out of the hooks of the selected needles over the latches and down the needle shanks while it slides down the back of the nonselected needle shanks. When the needles have taken yarn and descend to form new loops and cast off the old loops as stitches, the elastomeric yarn in front of the selected needles is also cast off. This continues until a protuberance is to be produced in the fabric. At that point only that part of the fabric outside the protuberance area is formed in accordance with my reissue patent above mentioned, the fabric in the protuberance area incorporates the elastomeric yarn as an extra knitted partial course in the area of the protuberance. That is the same elastomeric yarn which in the area outside the protuberance is inlaid, is knitted to form a partial course of knitted stitches in the protuberance area and then is again inlaid as the needles pass out of the protuberance area. The knitted stitches of elastomeric yarns may occur in every wale of the partial knitted courses or in spaced wales with the yarn floating between spaced stitches.

At the point where the protuberance area begins, the selected needles which normally take elastomeric yarn at tuck level are caused instead to rise to clear level (in some embodiments all the needles rise) and the elastomeric yarn caught in the hooks is drawn into loops and, in the next rise and fall of the needles, is cast off as knitted stitches. The shape of the area can be varied in many ways to conform to contours of the protuberance to be covered.

At the end of the protuberance area, the selected needles are caused to again rise only to tuck level while the nonselected needles do not rise whereupon the elastomeric yarn is again inlaid in the manner described above.

Selected needles may be raised to tuck level in part of a course round and to clear level in other parts of the same round by a number of devices among which are the use of needles of different butt height, the use of intermediate jacks of different butt height, the use of modified selected slides to raise selected cylinder jacks superseding the original pattern mesh selection and the use of special pattern selection initiated by the pattern drum and activating certain selector jacks or cylinder slides. Two of these methods are illustrated with fabric typical of each method.

Referring once more to the drawings:

In FIGURE 1, a full length ladies' elastic stocking 10 is shown with an elastic boot 11, a turned welt 12, a shadow welt 13, a toe 14, and a heel 15. A below-the-knee stocking is also shown constructively with a welt 20. Likewise a sock is shown constructively with a welt 21. These garments are made with the boots and welts made in the usual manner with either bare or covered elastomeric yarn inlaid in the elastic portion by the methods described in my aforementioned reissue patent. However, whereas the heel portion is made in accordance with the teachings of the patent by reciprocation, the heel portion of the present invention is made by continuous circular knitting. One embodiment of that portion of the garments in which the boot and heel join, is illustrated in FIGURE 7. As made on the modified Scott and Williams AMF machine the needle circle of 401 needles is made up for knitting the stocking illustrated as follows: 200 short butt needles (.240″) are used as a block for the instep area $a$, extending from the point of the heel on one side to the point of the heel on the other side. The area $b$ extending around the heel from heel point to heel point consists of 201 longer butt needles arranged in steps of three butt lengths. In the area at the back of the heel along the lines 17 and 17$a$ are 109 needles with .390″ butt lengths. Next along the lines 18 and 18$a$ are 46 needles, 23 on each side of intermediate butt lengths. (.338″). Finally, adjacent the short butt needles and along the lines 19 and 19$a$, are 23 needles on each side with .300″ butts. As has been previously indicated, only selected needles (preferably alternate needles) rise to take elastomeric yarn at tuck level in inlaying it to produce normal elastomeric stretch fabric. When using the Scott and Williams machine with the cam ring modified as in FIGURE 9, the selected needles are the only needles which knit elastomeric yarn although on each revolution of the needles, the selected needles change.

On that machine, an auxiliary needle-raising came (84 on FIGURE 9) engages the long butt needles already selected and raised to tuck level and raises them further to clear level. This auxiliary needle-raising cam is activated by the main cam drum when the protuberance covering (heel) is to be produced. The auxiliary needle-raising cam is actuated to move inwardly in three steps. In its first step movement, it engages the longest butt needles (.390″). After several revolutions of the needle cylinder the auxiliary needle-raising cam is moved in another step to engage the .338″ butt needles and after several additional needle cylinder revolutions is moved in to engage the .300″ butt needles. After several needle cylinder revolutions, the auxiliary needle-raising cam is activated to recede step by step preferably but not necessarily to form a symmetrical heel. It is to be understood that those long butt needles which are not raised to clear level by the auxiliary needle-raising cam perform the same movements as in producing the normal elastomeric stretch fabric, that is the non-selected needles do not rise at the elastomeric feed and the selected needles whose butts do not engage the auxiliary needle-raising cam rise only to tuck level. As a result the elastomeric yarn is inlaid by the action of those needles and the adjacent sinkers.

With conventional stockings knitted on the Scott and Williams machine, the heel pocket is normally knitted on short butt needles while the toe is normally knitted on long butt needles where reciprocation is employed. With this invention if one wishes to use reciprocation to form the toe, it is best done on the short butt needles so that the sewing or looping falls under the foot automatically. Obviously a faster, more economical method, with multifeed machines is to knit the toe by continuous circular motion and cut and sew to form a seam 16 around the toe.

In FIGURE 2 a typical girdle 25 of the panty type is illustrated schematically. Normal elastomeric stretch fabric 26 is used in the waist, front and leg portions. This fabric has its elastomeric stretch (due to inlaid elastomeric bare or covered yarn) substantially in a circumferential direction. The fabric is normally knitted as a tube with the leg and crotch portions cut and sewn. In the girdle areas which cover the fleshy protuberances of the derriere 27, two-way stretch and some shaping is desirable, however, and the elastomeric yarn is knitted as a series of extra partial courses of knitted stitches in accordance with the invention. Obviously the garment may be made with non-elastic leg and/or crotch portions or without such portions at all in the form of a sarong-type girdle if desired. An inelastic front panel may be attached to flatten the stomach area if that is desirable.

In FIGURE 3 a circular knit shaped brassiere 30 is illustrated schematically. The garment has normal elastomeric stretch fabric 31 in all areas except those which cover the protuberances of the breasts 32. The straps 34 and 34a are optional and may be of any ribbon type material sewn to the brassiere proper. In accordance with the invention, the elastomeric yarn is knitted in the areas 32 as extra courses extending preferably only to the protuberance edges so that a fitted elastically expandable pocket is formed. In the remainder of the brassiere proper, including the waist 33, the elastomeric yarn is inlaid to give substantially circumferential stretch.

In FIGURE 4, an elbow or knee bandage or guard 35 is illustrated schematically. This product preferably has a tapered tubular elbow shape with the bend caused by the extra partial courses of elastomeric yarn in the area 37 which area is intended to cover the body joint. This area has longitudinal and circumferential elastomeric stretch whereas in the area 35 the stretch is largely circumferential due to the fact that the bare or covered elastomeric yarn is inlaid. This garment may be produced on either of the machines whose cam ring layout is illustrated, by the manner set forth in the specification for inlaying elastomeric yarn in one portion of the circumference and knitting the same elastomeric yarn in the area intended to cover the joint.

FIGURE 5 illustrates schematically a typical tubular blank 40 made in accordance with the invention from which two men's athletic supporters 41 and 41a may be cut. The ends of the blank 42 and 42a preferably are constituted of normal elastomeric stretch fabric, that is, fabric which is circumferentially stretchable because of inlaid elastomeric yarn. These two blank ends, when the respective garments are cut, become the seamless waistbands of the respective garments. Between the ends are areas 43 and 43a in which the elastomeric yarn (which may be bare or covered) is knitted to form two partial courses of knitted stitches of elastomeric yarn in each revolution of the needle cylinder. These partial courses together with the other knitted courses in areas 43 and 43a constitute the pouch portions of the two supporters. Each pouch portion is wider adjacent its respective waistband than at its bottom. The respective pouches, whose shapes are complementary, are separated in the blank by a border of normal elastomeric stretch fabric. By cutting diagonally through this border at each side and across the bottom of each pouch, two garment blanks are produced. These blanks may be finished by sewing, sealing or otherwise securing the cut edges.

In FIGURE 6, a bathing suit 50 is shown schematically as representative of trunk-covering body garments made in accordance with the invention. The main body of the garment except for the straps 54, which are optional, is made in accordance with the invention of normal elastomeric stretch fabric 51 with the exception of the buttock areas 52 and the breast areas 53 which are shaped and made elastic in all directions by knitting in the elastomeric yarn in these areas as extra partial courses rather than inlaying it as is done in the normal elastomeric stretch fabric. The transition from one area to the other and back is accomplished by the methods described herein.

In FIGURE 7, a typical fabric 60 of the invention is illustrated showing the transition from normal elastomeric stretch fabric whose stretch is largely circumferential to two-way stretch fabric and back again to normal stretch fabric. In the illustration, courses 61, 61a, 61b, 61c, 61d, 61e, 61f, and 61g represent courses of structural yarn such as nylon. The elastomeric yarn is indicated by the numerals 62, 62a, 62b and 62c. In the upper portion of the illustrated fabric, the courses 61, 61a, 61b and 61c form a jersey fabric in which the elastomeric yarn 62 and 62a is inlaid in every other course. In the next revolution of the needle cylinder, the elastomeric yarn 62b is inlaid in the left-hand portion, is in the process of conversion in the portion marked 63 and finally forms the stitch 64 in alternate wales. Proceeding to the right, the yarn is again in the process of conversion at 63 from knitting to inlaying, the conversion being accomplished at the right edge of the illustration.

Two courses later when the elastomeric yarn 62c is again inlaid at the left of the illustration, the conversion at 63a occurs one wale earlier and the knitted stitches 64 of elastomeric yarn occur in the wales intermediate those of the knitted stitches of the previous adjacent round of elastomeric yarn.

It should be understood that where there is only one elastomeric yarn feed the elastomeric yarn is continuous from round to round of its spiraloid course but where there are two feeds each feed winds elastomeric yarn spiraloidally and adjacent rounds of elastomeric yarn are not the same yarn.

Figure 8:
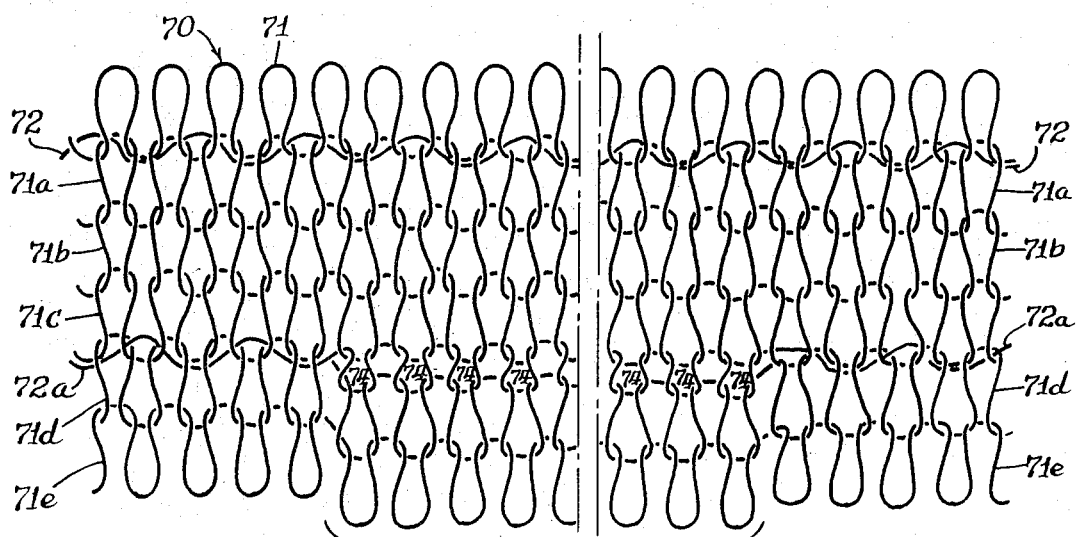
FIGURE 8 illustrates another typical fabric of a garment of the invention wherein the elastomeric yarn is inlaid in every third course except in the area of the protuberance where it is knitted to form an interposed partial knitted course with stitches in every wale.

In FIGURE 8, a typical fabric 70 of the invention with a protuberance area 75 is knitted on a four-feed machine with one of the feeds utilized in inlaying and knitting the elastomeric yarn. The illustration shows the transition from normal elastomeric stretch fabric in which the elastomeric yarn is inlaid in every third course, to fabric in which the protuberance area in which the elastomeric yarn 72a is knitted in every stitch to form an extra partial course of stitches of elastomeric yarn. In the illustration, courses 71, 71a, 71b, 71c, 71d and 71e represent nonelastomeric structural yarn. Elastomeric yarn 72 is outside the protuberance area and is inlaid. Yarn 72a may be a continuation of yarn 72 or alternatively, where two elastomeric feeds are employed, may be a separate yarn. Yarn 72a is shown inlaid at the left of the illustration but knitted to form a partial course of stitches 72 in the protuberance area and then again inlaid at the right of the illustration.

In FIGURE 9, a modified Scott and Williams AMF knitting machine cam ring layout 80 is shown. The machine normally has three stitch cams, a center stitch cam 81, a right-hand or reverse stitch cam 82 and a left-hand stitch cam 83. The cam ring shown introduces a fourth knitting station with cams 84 acting as an auxiliary needle-raising cam and cam 116 acting as a movable draw-down cam. In the illustration, a sinker 88, a latch needle 85, an intermediate jack 86 and a cylinder jack 87 are shown at the right of the cam ring layout. The needles will rise whenever they are actuated by cams which raise either the cylinder jacks or the intermediate jacks and also when their own butts engage needle-raising cams. The needles are lowered, however, only when their own butts engage needle-lowering cams such as draw-down cams.

The needle cylinder moves from the right-hand side of the cam ring layout towards the left, two sets of needles being involved, the selected needles (preferably alternate needles) and the nonselected needles. On each rotation of the needle cylinder, the selected needles change.

In kitting the heel area the needle butts pass over the jack gate cam 110 and since the raising cam 117 is out of action, pass horizontally until they strike the lowering cam 119. The selection of needles is made as the needles pass under the cam, the selected needles being raised by alternate intermediate jacks 86 which rise on intermediate jack-raising cam 108. The nonselected intermediate jacks pass under jack guard cam 107 and remain at that level until a complete revolution of the needle cylinder is made. The selected alternate needles are thus raised to tuck level by the selected intermediate jacks. Where these needles are not raised to clear level by the auxiliary needle-raising cam 85, they inlay the elastomeric yarn with the help of the sinkers as has been explained. The auxiliary needle-raising cam 84 moves inwardly in steps contacting the longest butt needles first. The illustration shows that point of knitting the heel at which the cam 84 has moved in all the way and is engaging and raising to clear level all of the long butt selected needles. The nonselected long butt needles pass under this cam. The selected short butt needles not engaged with cam 84 are raised only to tuck level. Thus the needles which are raised to clear level with elastomeric yarn in their hooks, draw a loop of elastic yarn when the needle descends to cast off the previous stitch. On the next rise to clear level and the subsequent descent, an elastomeric yarn stitch is cast off. If, however, a selected needle rises only to tuck level, it inlays the yarns as has been explained previously.

Alternately cam 84 may be made sufficiently long as to engage both the selected and nonselected long butt needles. In that case when cam 84 moves in sufficiently to engage needles of a particular long butt length it engages both selected and nonselected needles and all of the so engaged needles are raised to clear level and knit elastomeric yarn. Those needles with butt lengths too short to be engaged by the cam 84 on a particular revolution of the needle cylinder are still controlled in the usual manner for normal elastomeric stretch fabric in which the elastomeric yarn is inlaid, the selected needles both of long butt needles which are not engaged by cam 84 and short butt needles which are never engaged by cam 84 rising to tuck level while the nonselected needles (not engaged by cam 84) do not rise at this feed.

Reference is made once more to FIGURE 9 and particularly to movable draw-down cam 116. This cam has a variable depth control and an independent in and out control. The depth control feature which permits cam 116 to be lowered causes the needles to draw down further before passing under the cam permitting the machine to consume larger amounts of elastomeric inlay yarn without disturbing the normal stitch size control which operates by raising and lowering the needle cylinder. Thus without changing the knitted structural stitch length, this feature permits more elastomeric yarn to be consumed as an inlay in selected areas where that might be desirable such as the upper thigh portion of a stocking. Attempting to feed in more elastomeric yarn than the machine will normally consume results in loss of control of the elastomeric yarn. Control is important in all cases but it is particularly important in those cases where the elastomeric yarn may be an unbalanced yarn.

Referring once more to FIGURE 9, the remaining illustrated parts of the cam ring layout have their usual well-known functions and will be innumerated for identification with little comment. Elastomeric feed 89 should be so located that elastomeric yarn is available at tuck level to the needles as they descend draw-down cam 116.

Structural yarn feeds 90 and 91 may feed any of the usual structural yarns such as cotton, silk, nylon and polypropylene with thermoplastic yarns being preferred. These yrans may be used as multistrand yarns or when the yarns are thermoplastic, as monofilament yarns, S and Z-twist yarns and other types of stretch yarns. Cam 92 is the right-hand clearing cam. Cam 93 is the left-hand clearing cam. Cam 94 is the center stitch cam box cam. Cam 95 is the reverse stroke left-hand needle-lowering cam. Cam 96 is the reverse stroke needle-raising and lowering cam. Cam 97 is the left-hand stitch cam box cam. Cam 98 is the right-hand stitch cam box cam. Cam 99 is the needle-leveling cam. The dropper 100 is flanked by left-hand auxiliary needle-raising and lowering cam 122 and right-hand auxiliary needle-raising and lowering cam 123. Cam 101 is a movable end cam. Cam 102 is a movable intermediate jack-raising cam. Cam 103 is an intermediate jack boxing-in cam. Cam 104 is an intermediate jack-raising cam. Cam 105 is the right-hand jack guard cam. Cam 106 is the left-hand jack guard cam. Cam 109 is the left-hand stitch end cam. Cam 111 is the intermediate jack-lowering and boxing-in cam. Cam 112 is the auxiliary side and intermediate jack draw-down cam. Cam 113 is the right-hand needle-leveling cam. Cam 114 is an intermediate jack-lowering and boxing-in cam. Cam 118 is the gusset cam. Cam 120 is the dividing cam. Cam 121 is the lowering switch cam. Cam 124 is the jack-leveling cam. Cam 125 is the jack-leveling and boxing-in cam. Cam 126 is the pattern jack-raising cam. Cam 128 is the jack-retaining cam. Cam 129 is a guard cam. Numeral 127 designates the selector fingers.

Referring now to FIGURE 10, a cam ring layout 150 for the Singer-Fidelity LBMF machine (whose operation is fully described in above mentioned U.S. Patent No. 3,148,518) is shown with certain modifications to permit its use in producing elastomeric stretch stockings of this invention. The four-feed LBMF machine without modification is equipped to manufacture tube type stockings having conventional turned welt, shadow welt, boot and foot sections. The machine is set up to provide simple mesh patterns. At feeding stations 1 and 3, specific needle selection between knit and tuck levels is provided.

The preferred method of modifying the LBMF machine cam ring layout is to utilize the number one feeding station for inlaying and knitting the elastomeric yarn. As has been previously indicated, when inlaying elastomeric yarn, certain selected needles rise to tuck level while nonselected needles do not rise or at least rise only to float level. The selecting means of the LBMF machine (without modification) necessarily causes the needles to rise too high for inlaying. The problem then was to lower the needles to the proper level. The originally shaped needle end cam raised all needles to tuck level. The profile of this cam was modified substantially to that of cam 169. A gate cam 158 was inserted to raise all needles to float level when engaged. Cover cam 159 was added and the following slides were lowered and lengthened: Number 1 make-up and transfer selecting slide 172, number 1 mesh jack selecting slides 173 and heel fabric slides 174.

Cams 151, 152, 153 and 154 are the main stitch cam and stitch cams 2, 3, and 4, respectively. Cams 178, 179, 180 and 177 are the main stitch box cam and the box cams for stitch cams 2, 3, and 4 respectively. Cam 167 is the number 2 needle clearing cam, but also acts as number 1 needle end cam. It has a horizontal groove 185 through which alternate needle butts pass when slide 162 (the number 2 needle clearing cam slide) is withdrawn, and slide 161 (the number 2 makeup jack selecting slide) is active. Cam 168 is the number 3 needle-raising cam and also acts as the number 2 needle end cam. Slide 164 is the number 3 needle-clearing cam slide. Cam 165 is the number 3 makeup draw-down cam. Cam 166 is the number 4 needle-clearing cam and is also the number 3 needle end cam. Cams 155, 156, and 157 are respectively the transfer and clearing cam, the number 1 needle-clearing cam slide, and the transfer and makeup needle draw-down cam. Slides 170 are the number 3 mesh jack selecting slides. Ring 175 is the jack rest ring. Cam 176 is the jack guard cam. Numeral 182 represents the transfer jacks. Numeral 183 represents the needle butts. Numeral 184 represents the approximate point at which the needles selected by slide 172, the number 1 makeup and transfer jack selecting slide, begin to rise to clear level while the other needles continue at float level until drawn down by the transfer and makeup needle draw-down cam 157.

Figure 13:
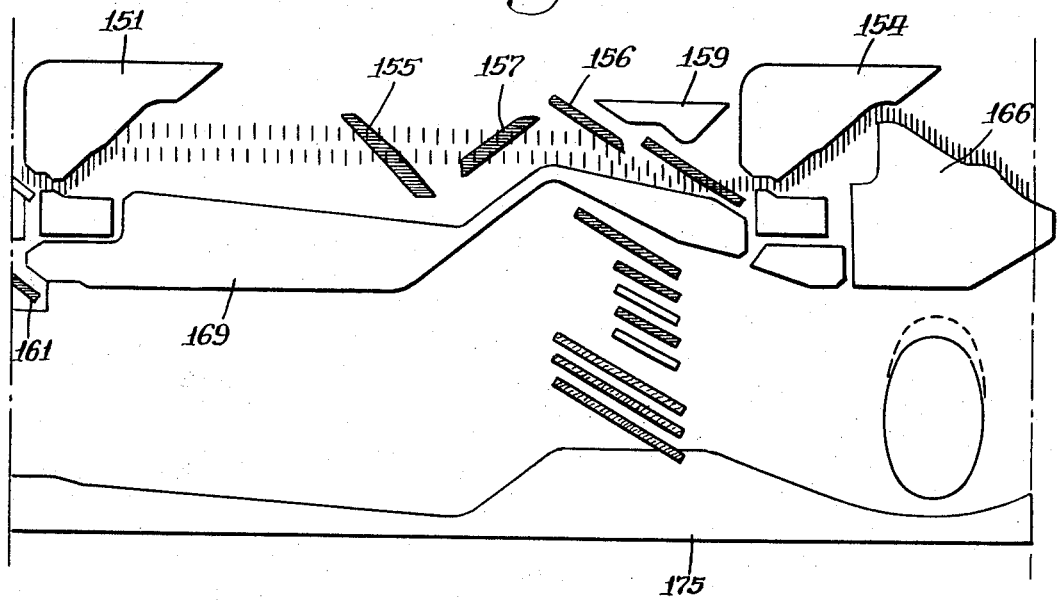
FIGURE 13 illustrates the needle movement of the modified LBMF machine in making the boot and foot excepting the heel and instep.
Figure 14:
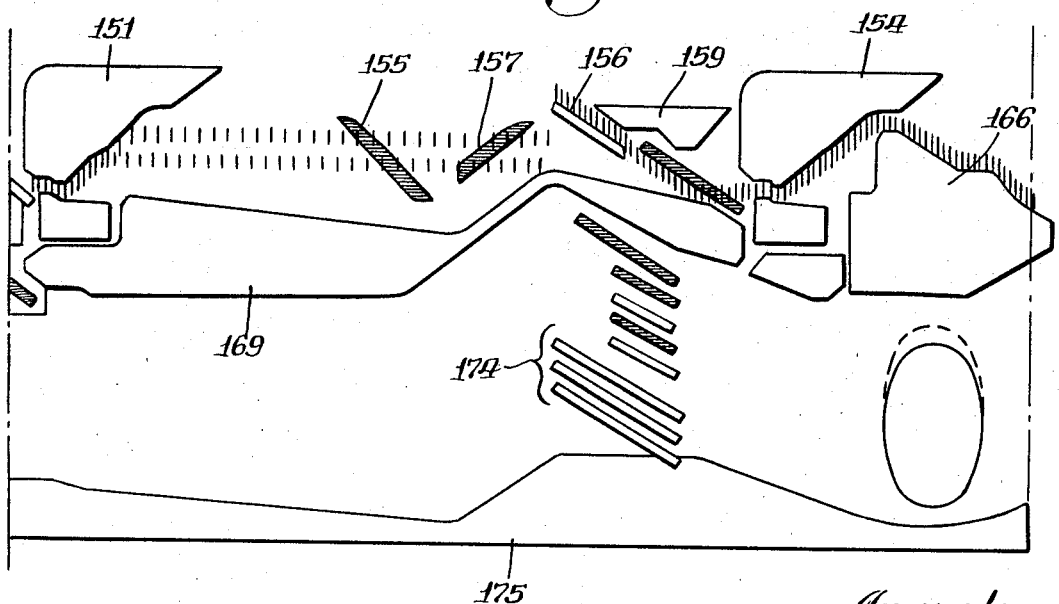
FIGURE 14 illustrates the needle movement of the modified LBMF machine in making the heel and instep.

The needle butt movements for the initial makeup are shown in FIGURE 10. The needle butt movement in subsequent makeup is shown in FIGURES 11 and 11a which are complementary. These same FIGURES, 11 and 11a, show the needle butt movement for transfer after the welt is completed. The needle butt movement, in making the welt, is shown in FIGURES 12 and 11a which are complementary. The needle butt movement used in making the boot and foot excepting the heel and instep is shown in FIGURES 13 and 11a which are complementary. The needle butt movement in the heel and instep is shown in FIGURES 14 and 11a which are complementary.

In FIGURE 15, pattern jack 200 is shown before the jack butts are cut. Butts may be cut off entirely, not cut at all, or cut into as many as 9 different lengths. Butts 207, 208, and 209 are shown marked for butt lengths a, b, or c, but these butts engage the heel fabric slides 174 individually from top to bottom respectively and if a heel is desired having a greater number of transition steps from normal elastomeric stretch inlaid fabric to elastomeric knitted heel fabric, all of the different butt lengths may be utilized, making 25 transition steps. Butt 202 engages slide 172, the number one makeup and transfer selecting slide. This butt is usually left uncut in every other jack and uniformly cut short in the intermediate jacks. The extra jack has its butt 202 uncut. Butts, 203, 204, 205, and 206 engage the mesh jack selecting slides 173 individually from top to bottom, respectively. Normally these butts are either uncut, cut uniformly short, or cut off entirely. When the jacks are controlling needle levels, the top of the jack pushes against the butt 210 of a needle 201 but where a needle raising cam is engaged with a needle butt, the butt is lifted from contact with the jack as is well known.

Preferred stockings of the invention knitted on the LBMF machine are knitted in the usual manner as set forth in Patent No. 3,148,518 down to the point where the boot begins. The needle movements between No. 4 stitch cam 154 and the main stitch cam 151 may be somewhat different, but in those sections which do not involve elastomeric yarn in the preferred garments, the needles knit or do not knit at the main stitch cam in the same way and the fabric in these sections is the same. Conventional stockings knitted on the machine do have a variety of possible welts and shadow welts and these may be used in the garments of this invention.

When the boot section of the garment is to be knitted, a yarn furnisher such as that previously mentioned is activated after the yarns at feed 2, 3, and 4 are exchanged to provide the desired degree of sheerness. At number one feeding station, the welt yarn is exchanged for the elastomeric yarn, preferably but not necessarily a covered elastromeric yarn. The number 1 mesh jack selecting slides 173 are implemented by activating slides number 2 and 4 from the top and this causes alternate needles to rise to tuck level while intermediate needles start at stitch-draw level and gradually rise on cam 169 to float level. The selected alternate needles take yarn in their hooks while the intermediate needles do not. The elastomeric yarn is subsequently pushed behind the intermediate needles. At number 2 needle clearing cam 162, all of the needles rise causing the elastomeric yarn to slide down the back of the shanks of intermediate needles and over the latches and down the shank fronts of selected alternate needles. The loops of the structural stitches drawn at stitch cam number 4, but not cast off at stitch cam number 1 because needles had not risen to clear also slide down the needle shanks. The needles take new yarn which is drawn into loops at number 2 stitch cam 152 and as the needles go under cam 152, the stitches drawn at stitch cam number 4 are cast off together with the elastomeric yarn which is in front of the needles. The elastomeric yarn is thus inlaid. The knitting of structural yarns at feeds 2, 3, and 4 continues with elastomeric yarn inlaid in the course which normally would be cast off at number 1 stitch cam, but which is cast off instead at number 2 stitch cam. This fabric is continued until the heel section and instep section are to be knit. This section is illustrated with the needle movements at the transition point in FIGURES 14 and 11a.

In FIGURE 14, the heel fabric slides 174, which up to this time have been inactive, are activated. The first needle butt engaged by these slides as they move inwardly to engage the jack butts, is shown at the top of cam 156. The needle butts shown to the left and below cam 156 were those controlled by number 1 mesh jack selecting slides. When the heel fabric slides are activated, they override the selection of the mesh jack selecting slides and as the heel fabric slides move in, they engage a wider band of jack butts causing the needles to knit elastomeric yarn in a larger arc of the knitting circle until the heel fabric slides begin to recede and the process is reversed. Obviously those needles not elevated by the heel fabric slides continue to be controlled by the number 1 mesh jack selecting slides which raise alternate jacks causing the needles they control to rise to tuck level to engage the elastomeric yarn for inlaying.

The products of this invention are preferably made very sheer and fine but, obviously, very coarse garments also may be made in the same manner without departing from the invention. When very fine guage machines and fine yarns are utilized, the protuberance areas may be made substantially indistinguishable from other areas. Stockings, for instance, may be made with heels which appear nude. The heel area when the stocking is worn is so similar to the instep area that the heel may be made much larger than ordinarily is the case with broad forward transition lines so that the pull of the heel is not concentrated on a small area of the instep. This feature eliminates many of the wrinkles which otherwise appear at the bend of the instep.

Typical of the yarns which are used at the four feeds of a tubular stocking machine in making the stockings of the invention are the following.

*Example 1*

Welt and shadow
 welt: Feeds 1–4   40 denier, 10 filament, nylon 66, 7 turns S.
Boot, instep, foot and heel:
 Feed 1 _____ 20 denier Lycra spandex core, 10 denier, 7 filament, nylon 66, single covering.
 Feed 2 _____ 15 denier monofilament, nylon 66, S torque.
 Feed 3 _____ 15 denier monofilament, nylon 66, Z torque.
 Feed 4 _____ 15 denier monofilament, nylon 6, pirn.
Toe: Feeds 1–4 __ 40 denier, 10 filament, nylon 66, 7 turns S.

Example 2

Welt and shadow welt: 1-4 _____ 40 denier, 10 filament, nylon 66, KDK.

Boot, instep, foot and heel:
- Feed 1 _____ 40 denier Lycra spandex core, 30 denier, 20 filament, nylon 6, single covering.
- Feed 2 _____ 20 denier monofilament, nylon 66, pirn.
- Feed 3 _____ 20 denier monofilament, nylon 66, pirn.
- Feed 4 _____ 20 denier monofilament, nylon 66, pirn.

Toe: Feeds 1-4 ___ 40 denier, 8 filament, nylon 6, 7 turns S.

Example 3

Welt and shadow welt: Feeds 1-4 40 denier, 8 filament, nylon 6, superloft.

Boot, instep, foot and heel:
- Feed 1 _____ 70 denier Lycra spandex core, 30 denier, 20 filament, nylon 6, single covering.
- Feed 2 _____ 2 ends 15 denier monofilament, nylon 66, S torque.
- Feed 3 _____ 2 ends 15 denier monofilament, nylon 66, Z torque.
- Feed 4 _____ 30 denier monofilament, nylon 6, pirn.

Toe: Feeds 1-4 ___ 50 denier, 13 filament, nylon 6, 7 turns S.

Example 4

Welt and shadow welt:
- Feed 1 _____ 40 denier, 8 filament, nylon 6, textra.
- Feed 2 _____ 40 denier, 8 filament, nylon 6, KDK.
- Feed 3 _____ 40 denier, 8 filament, nylon 6, textra.
- Feed 4 _____ 40 denier, 8 filament, nylon 6, KDK.

Boot, instep, foot and heel:
- Feed 1 _____ 140 denier Lycra spandex core, 30 denier, 20 filament, nylon 6, single covering.
- Feed 2 _____ 3 ends 15 denier monofilament, nylon 66, S torque.
- Feed 3 _____ 3 ends 15 denier monofilament, nylon 66, Z torque.
- Feed 4 _____ 3 ends 15 denier monofilament, nylon 6, pirn.

Toe: Feeds 1-4 ___ 50 denier, 13 filament, nylon 6, 7 turns S.

In the examples above the designation KDK refers to a yarn which has been knit and then deknitted; superloft refers to a false twisted yarn; textra is a shortened designation for bulked textralized nylon yarn; and pirn is a low twist yarn as it comes from the producer without modification.

The term "jersey-knit" as used in this invention and in the clams is intended to include plain jersey stitch, combinations of plain jersey stitches and floats and various fancy and tuck stitches combined with jersey stitches with or without floats.

I claim:

1. A garment including a jersey-knit tubular elastomeric stretch fabric portion comprising at least two areas, a first area in which at least one elastomeric yarn is inlaid and locked in every course in which it occurs and in which major portions of said one yarn extend coursewise and a second area of said tubular stretch portion in which said one yarn is continuous from said first area to said second area being disposed in said second area in a plurality of elastomeric yarn stitches in a plurality of extra partial courses thereby forming a convexity in said tubular portion which has elastomeric stretch in all directions, at least one elastomeric yarn stitch being disposed in every wale in said area.

2. The garment of claim 1 wherein the jersey-knit tubular elastomeric stretch portion is the elastomeric stretch portion of an elastic stocking and wherein the second area is the heel of said stocking.

3. The garment of claim 1 wherein the one elastomeric yarn is a covered yarn.

4. The garment of claim 1 in the form of a bathing suit.

5. The garment of claim 1 in the form of a joint guard.

6. The garment of claim 1 in the form of a brassiere.

7. The garment of claim 1 in the form of a foot covering garment.

8. The garment of claim 1 in the form of a girdle.

9. The garment of claim 1 in the form of a bifurcated covering for the lower trunk.

10. The garment of claim 1 in the form of an athletic supporter.

11. The garment of claim 1 wherein the elastomeric yarn is a bare thermoplastic elastomer.

12. The garment of claim 1 wherein the structural yarns other than elastomeric yarns are nylon.

13. The garment of claim 1 wherein the second area is substantially indistinguishable from the first area when worn.

14. The garment of claim 2 wherein the elastic stocking is a sheer stocking of street-wear appearance in which the heel has substantially the appearance of a nude heel indistinguishable from the remainder of the stocking except on very close scrutiny.

References Cited

UNITED STATES PATENTS

| Number | Date | Name | Class |
|---|---|---|---|
| Re. 25,046 | 10/1961 | Knohl | 66—190 XR |
| 2,050,535 | 8/1936 | Martel | 66—178 |
| 2,102,369 | 12/1937 | Martel. | |
| 2,120,066 | 6/1938 | Crimmins | 66—190 |
| 2,223,749 | 12/1940 | Thurston et al. | 66—190 XR |
| 2,238,353 | 4/1941 | Weintraub | 66—202 XR |
| 2,276,045 | 3/1942 | Kattermann | 66—176 |
| 2,378,780 | 6/1945 | Lombardi | 66—176 XR |
| 2,707,381 | 5/1955 | Lombardi | 66—171 |
| 2,883,842 | 4/1959 | Knohl | 66—178 |
| 2,962,885 | 12/1960 | Knohl | 66—171 XR |
| 2,977,782 | 4/1961 | Sheek | 66—173 |
| 3,013,420 | 12/1961 | Cormier | 66—190 |
| 3,241,340 | 3/1966 | Knohl | 66—185 |

FOREIGN PATENTS

| 104,044 | 6/1938 | Great Britain. |
|---|---|---|

MERVIN STEIN, *Primary Examiner.*

RONALD FELDBAUM, *Assistant Examiner.*

U.S. Cl. X.R.

66—178, 185, 187